United States Patent [19]

Inaba et al.

[11] 4,179,412

[45] * Dec. 18, 1979

[54] PROCESS FOR PRODUCING CATALYST PRECURSORS FOR DECOMPOSING AMMONIA BY OXIDATION AND PRECURSORS PRODUCED BY SAID PROCESS

[75] Inventors: Hideya Inaba; Yasumi Kamino; Shigenori Onizuka; Chikashi Inazumi, all of Osaka, Japan

[73] Assignee: Hitachi Shipbuilding & Engineering Co., Ltd., Osaka, Japan

[*] Notice: The portion of the term of this patent subsequent to Oct. 9, 1996, has been disclaimed.

[21] Appl. No.: 873,693

[22] Filed: Jan. 30, 1978

[30] Foreign Application Priority Data

Mar. 14, 1977 [JP] Japan ............................... 52/28297
Sep. 20, 1977 [JP] Japan ............................... 51/113079

[51] Int. Cl.$^2$ .................... B01J 23/22; B01J 23/42; B01J 25/00

[52] U.S. Cl. ................................ 252/472; 252/464; 252/466 B; 252/466 PT; 252/477 Q; 423/213.5; 423/239

[58] Field of Search ............. 252/464, 466 PT, 466 B, 252/477 Q, 472; 423/213.5, 239 A

[56] References Cited

U.S. PATENT DOCUMENTS

| 3,712,856 | 1/1973 | Betz | 252/466 B |
| 3,839,225 | 10/1974 | Acres | 423/239 |
| 4,040,981 | 8/1977 | Inaba et al. | 252/465 X |
| 4,076,792 | 2/1978 | Foster et al. | 423/213.5 |

Primary Examiner—W. J. Shine
Attorney, Agent, or Firm—Armstrong, Nikaido, Marmelstein & Kubovcik

[57] ABSTRACT

A catalyst for decomposing ammonia by oxidation is produced by converting the surface layer of steel material of specified shape resembling a ring, honeycomb, plate or the like to an aluminum alloy, treating the steel material with an aluminum dissolving solution to dissolve out the aluminum and to render the surface layer porous, subjecting the steel material to oxidation treatment to obtain a catalyst carrier, and causing the carrier to support platinum.

15 Claims, 7 Drawing Figures

PROCESS FOR PRODUCING CATALYST PRECURSORS FOR DECOMPOSING AMMONIA BY OXIDATION AND PRECURSORS PRODUCED BY SAID PROCESS

BACKGROUND OF THE INVENTION

This invention relates to catalysts for decomposing ammonia ($NH_3$) to nitrogen gas ($N_2$) and water ($H_2O$) by oxidation for the treatment of ammonia contained in various exhaust gases.

Ammonia is a harmful substance with a noxious odor, and legal regulations are imposed on the quantity of ammonia to be released into the atmosphere. In recent years, research efforts have been directed to the denitration process which uses $NH_3$ as a reducing agent for the selective catalytic reduction of nitrogen oxides ($NO_x$). With this process, nitrogen oxides are reduced to harmless $N_2$ with $NH_3$ at a temperature of 300° to 400° C. in the presence of a catalyst. To effect the denitration reaction rapidly, steadily and continuously, $NH_3$ is usually fed at a rate in excess of the stoichiometric amount, consequently permitting an excess of $NH_3$ to be released into the atmosphere along with the treated gas. In the case where the denitrating apparatus is equipped with a wet-type desulfurizing unit downstream therefrom, $NH_3$ is likely to dissolve into the desulfurizing absorption liquid and will be discharged as contained in the effluent. Moreover $NH_3$ will react with the untreated sulfur oxides ($SO_x$) passing through the denitrating apparatus, forming $(NH_4)_2SO_3$, $(NH_4)_2SO_4$, $NH_4HSO_3$, $NH_4HSO_4$ and like salts which would clog up the heat exchanger and other devices disposed downstream from the denitrating apparatus.

In order to eliminate these problems, the quantity of $NH_3$ flowing out from the denitrating apparatus must be minimized to the greatest possible extent. For this purpose, we have carried out research on the use of $NH_3$ decomposing catalyst at a location downstream from the reaction layer within the denitrating reactor as the most feasible method. Such catalysts for decomposing $NH_3$ by oxidation must have the following characteristics.

(1) High activity to oxidize and decompose $NH_3$ which can be sustained with stability within the range of reaction temperatures for denitration.

(2) Low activity to convert $NH_3$ to $NO_x$.

(3) Freedom from poisoning by $SO_x$ contained in exhaust gases.

(4) Reduced activity to oxidize $SO_2$, contained in emissions, to $SO_3$. ($SO_3$, if formed, would raise the dew point of exhaust gages, create corrosion in devices and cause air pollution, hence objectionable.)

(5) Usability in the form of a packed layer with a reduced pressure loss.

$NH_3$-containing exhaust gases further include those resulting from the combustion or thermal decomposition of nitrogen-containing substances such as industrial wastes and those released from flues and other devices in which $NH_3$ is intentionally added to the exhaust gas to inhibit the corrosion of the device. Gases discharged from electric dust collectors similarly contain $NH_3$ which is added thereto to ensure improved dust removal efficiencies. These gases also require the removal of $NH_3$ before disposal.

The catalysts for decomposing $NH_3$ by oxidation heretofore proposed include those comprising an oxide of Cr, Mn or like base metal. However, $SO_x$, if contained in the exhaust gas, would sulfatize the oxide, rendering the catalyst less active and unusable. It is also noted that catalysts conventionally used are generally in the form of cylindrical or spherical grains, but the catalysts of such shape are unfit for the treatment of quantities of gases because of the great pressure losses involved.

SUMMARY OF THE INVENTION

In view of the foregoing problems, we have conducted intensive research on the development of catalysts which will fulfil the foregoing requirements and accomplished this invention.

This invention provides a process for producing catalysts for decomposing $NH_3$ by oxidation comprising the first step of converting the surface layer of steel material of specified shape resembling a ring, honeycomb, plate or the like to an aluminum alloy, the second step of treating the steel material with an aluminum dissolving solution to dissolve out the aluminum and to render the surface layer porous, the third step of subjecting the steel material to oxidation treatment to obtain a catalyst carrier, and the fourth step of causing the carrier to support platinum.

Although the catalyst carrier prepared from a steel material by the first to third steps of the above process has some activity to oxidize and decompose $NH_3$ in itself, this activity rapidly reduces after the initiation of the reaction. Accordingly the carrier is not useful for the treatment of large quantities of exhaust gases. The fourth step in which the carrier is caused to support Pt thereon gives the carrier a stable sustained activity to decompose $NH_3$ by oxidation.

PREFERRED EMBODIMENTS OF THE INVENTION

Figure 1:
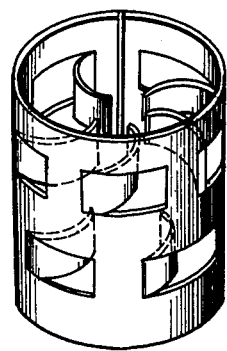
FIG. 1 is a perspective view showing a Paul ring.

According to this invention steel materials in the shape of a ring, honeycomb, plate or the like as specified are used because steel materials of such shape have high strength and are therefore unlikely to cause substantial pressure losses when used for the treatment of large quantities of exhaust gases. Examples of useful steel materials are stainless steel, carbon steel, nickel steel, tungsten steel, molybdenum steel, etc. These examples are not limitative; pure iron is of course usable.

In the first step, the surface layer of the steel material is converted to an aluminum alloy usually by coating the steel material with aluminum and heat-treating the aluminum-coated steel material. The steel material can be so coated, for example, by hot dipping, cementation, vacuum evaporation, spray coating or like plating method. The heat treatment is conducted at a temperature of not lower than the melting point (660° C.) of aluminum, preferably at about 800° C., for several minutes to several hours, preferably for about one hour. The heat treatment causes the solid phases of the steel material and aluminum to diffuse through each other, forming an alloy.

In the second step, the aluminum is dissolved out from the steel material having the alloy layer by immersing the steel material in a solution capable of dissolving aluminum or by spraying the aluminum dissolving solution against the alloy layer of the steel material. Examples of useful aluminum dissolving solutions are aqueous acid or alkali solutions. Examples of preferred acids are mineral acids such as hydrochloric acid and nitric acid. Examples of useful alkalis are sodium hydroxide and like alkali metal hydroxides, alkali metal carbonates, alkaline earth metal hydroxides, etc. Aqueous solutions of alkali metal hydroxides are especially preferable. The temperature of the aluminum dissolving solutions, although not particularly limited, is preferably room temperature to 100° C. The dissolving out of the aluminum from the steel material renders its surface layer porous. The steel material having the resulting porous surface layer is washed with water and dried in the usual manner.

In the third step, the steel material is subjected to oxidation treatment under mild conditions, for example, by contacting the porous surface layer with a gas containing 0.1 to 20.8% by volume of oxygen for instance at approximate room temperature to 400° C. for 0.1 to 20 hours. Water, $CO_2$ or $N_2$, if present in the oxidizing atmosphere, will produce little or no influence on the effects achieved by the treatment. In this way, a carrier is produced according to this invention.

The oxidized porous surface layer thus prepared has a porosity which is almost indeterminable by the usual $N_2$ adsorption method (BET method). The physicochemical properties of the surface layer also still remain to be fully clarified. Undoubtedly, however, the physicochemical properties thereof contribute a great deal to the sustained stability of the catalyst produced.

The carrier is made to support Pt thereon in the fourth step usually by immersing the carrier in a solution of chloroplatinic acid, platinum sulfate or like platinum compound, then withdrawing the carrier from the solution and drying the wet carrier. When an aqueous solution of chloroplatinic acid ($H_2PtCl_6$) is used for this treatment, the preferred concentration of the solution is 0.01 to 1.0% by weight calculated as Pt. The carrier is held immersed in this solution preferably for 10 minutes to one hour. The Pt-containing carrier withdrawn from the solution of platinum compound is dried in the usual manner at about 100° C. or slightly higher temperature. When this treatment is followed by another immersion treatment with use of a solution of rhodium compound, it is desirable to dry and fire the Pt-containing carrier at a temperature of 300° to 500° C. to prevent the Pt from dissolving in the solution of Rh compound. The product thus obtained is a highly active $NH_3$ decomposing catalyst containing 0.0001 to 0.1% by weight of Pt. Too high a Pt content is not desirable, because the catalyst, although having an improved $NH_3$ oxidizing activity, will also have an enhanced activity to oxidize $SO_2$. Conversely, when having an exceedingly low Pt content, the catalyst will not be so active as to effect a smooth $NH_3$ oxidizing reaction. Accordingly an optimum value of the Pt content is determined in accordance with the $NH_3$ and $SO_2$ concentrations of the exhaust gas to be treated, and the conditions for the immersion treatment are determined to give the optimum value.

Preferably the fourth step is followed by another step of causing the carrier to support rhodium by immersing the Pt-supporting carrier in a solution of Rh compound, then withdrawing the carrier therefrom and drying the wet carrier. Examples of useful Rh compounds are rhodium chloride, rhodium sulfate, etc. When an aqueous solution of rhodium chloride is used, the concentration of the solution is preferably 0.01 to 0.5% by weight, calculated as Rh. The immersion time is one minute to one hour, preferably several minutes. The wet carrier is dried in the usual manner at a temperature of at least about 100° C. The resulting catalyst contains 0.0001 to 0.1% by weight of Rh.

The Pt- and Rh-containing catalyst prepared in this way is advantageous in that the catalyst has a high inhibitive effect on the conversion of the $SO_2$ contained in exhaust gases to $SO_3$ and also acts effectively to inhibit the formation of NO due to the oxidation of $NH_3$.

It is desirable that before or after the fourth step of causing the carrier to support Pt, the carrier be made to support vanadium (V) thereon by immersing the carrier in an aqueous solution or oxalic acid solution of ammonium metavanadate ($NH_4VO_3$) or like vanadium compound, withdrawing the carrier and drying the wet carrier. The concentration of the V compound is preferably 0.01 to 1.0 mole/liter. The preferred immersion time is 10 minutes to 2 hours. Preferably the wet carrier is dried at about 100° C. or slightly higher temperature. After one of Pt and V has been supported first, the carrier is preferably fired before the other is supported thereon, whereby the metal supported first can be prevented from dissolving into the solution used for the following immersion treatment. The carrier is fired at a temperature of 600° to 700° C., preferably in a nitrogen atmosphere for about 90 minutes.

The Pt- and V-incorporating catalyst thus prepared has the advantage of being capable of inhibiting the formation of $NO_x$ due to the oxidation of $NH_3$ to a negligible extent.

EXAMPLE 1

Paul rings (26 mm in both diameter and length, 0.5 mm in wall thickness, 40 $cm^2$ in geometric surface area) of stainless steel, SUS 316 (JIS), as shown in FIG. 1 were immersed in a molten aluminum bath at 700° C. for 5 minutes, then withdrawn from the bath and thereafter heat-treated in an electric oven at 800° C. for one hour to convert the surface layer of the ring to an aluminum alloy. After cooling, the Paul rings were immersed in 200 ml of 10% aqueous solution of NaOH at 80° C. for 3 hours to dissolve out the Al from the alloy layer and render the surface layer porous. The Paul rings thus treated were withdrawn from the solution, washed with water treated with ion exchange resin, dried in the atmosphere and then subjected to three-stage oxidation treatment under the conditions listed in Table 1.

Table 1

| | Atmosphere | Heating Temp. (°C.) | Time (hr.) |
|---|---|---|---|
| 1st Stage | $O_2$ (2 vol. %) + $N_2$ (balance) | 100 | 1 |
| 2nd Stage | $O_2$ (10 vol. %) + $N_2$ (balance) | 200 | 1 |
| 3rd Stage | Air | 300 | 1 |

The carrier thus obtained was immersed in 200 ml of an aqueous solution of $H_2PtCl_6$ (0.59% by weight calculated as Pt) at room temperature for 30 minutes. The carrier was then withdrawn from the solution and dried at 110° C. for 3 hours, whereby a catalyst (A) was produced containing 0.01% by weight of Pt. (Each of the ring contained 1.6 mg of Pt.)

EXAMPLE 2

A Pt-containing catalyst (B) was produced in the same manner as in Example 1 except that the aqueous solution of $H_2PtCl_6$ used had a concentration of 0.06% by weight calculated as Pt.

EXAMPLE 3

The Pt-supporting carrier prepared in Example 1 was heat-treated at 400° C. for 2 hours and thereafter immersed in an aqueous solution of rhodium chloride (0.36% by weight calculated as Rh) at room temperature for 30 minutes. The carrier was withdrawn from the solution and dried at 110° C. for 3 hours, whereby a Pt- and Rh-containing catalyst (C) was obtained.

EXAMPLE 4

A catalyst carrier was prepared by repeating the same procedure as in Example 1 except that in place of the Paul rings, 20 mm × 25 mm × 50 mm panels of steel, SUS 304 (JIS) were used.

The carrier was immersed in 200 ml of aqueous solution of $NH_4VO_3$ (0.1 mole/l) at room temperature for 10 minutes, then withdrawn from the solution, thereafter dried at 110° C. for one hour and further fired in air at 650° C. for 90 minutes. Subsequently the carrier was immersed in 200 ml of aqueous solution of $H_2PtCl_6$ (0.3% by weight, calculated as Pt) at room temperature for one hour, withdrawn from the solution and then dried at 110° C. for one hour, whereby a V- and Pt-incorporating catalyst (D) was produced.

EXAMPLES 5-8

The same procedure as in Example 4 was repeated with use of the solutions of varying concentrations listed in Table 2, giving V- and Pt- containing catalysts (e), (F), (G) and (H).

Table 2

| Ex. No. | Solutions | | Catalyst |
|---|---|---|---|
| 5 | 0.01 mole/l $NH_4VO_3$ aq. soln. | $H_2PtCl_6$ aq. soln. (0.3 wt. %, calcd. as Pt) | E |
| 6 | 1.0 mole/l of $NH_4 VO_3$ in oxalic acid aq. soln. | Same as above | F |
| 7 | 0.1 mole/l $NH_4 VO_3$ aq. soln. | $H_2PtCl_6$ aq. soln. (0.1 wt. %, calcd. as Pt) | G |
| 8 | Same as above | $H_2PtCl_6$ aq. soln. (0.9 wt. % calcd. as Pt) | H |

EXAMPLE 9

The carrier obtained in the course of the procedure of Example 4 was immersed in 200 ml of aqueous solution of $H_2PtCl_6$ (0.3% by weight, calculated as Pt) for one hour, then withdrawn from the solution and thereafter dried and fired at 400° C. for 1.5 hours. Subsequently the fired product was immersed in 200 ml of aqueous solution of $NH_4VO_3$ (0.01 mole/l) for 10 minutes, withdrawn from the solution and then dried at 110° C. for one hour, whereby a Pt- and V-incorporating catalyst (I) was obtained.

EXAMPLES 10 and 11

The same procedure as in Example 9 was repeated with use of the solution given in Table 3 of different concentrations as listed, giving Pt- and V-containing catalysts (J) and (K)

Table 3

| Ex. No. | Concentration of $NH_4VO_3$ aqueous solution | Catalyst |
|---|---|---|
| 10 | 0.1 mole/l | J |
| 11 | 1.0 mole/l | K |

COMPARISON EXAMPLE 1

The carrier obtained in the course of the procedure of Example 4 was immersed in 200 ml of oxalic acid solution of $NH_4VO_3$ (0.1 mole/l) for 10 minutes, then withdrawn from the solution and dried at 110° C. for one hour, whereby a V-incorporating catalyst (N) was produced.

COMPARISON EXAMPLES 2 and 3

The same procedure as in Comparison Example 1 was repeated except that the solutions listed in Table 4 were used, giving a cobalt-incorporating catalyst (O) and a chromium-incorporating catalyst (P)

Table 4

| Comp. Ex. No. | Solution | Catalyst |
|---|---|---|
| 2 | 0.1 mole/l cobalt nitrate aq. soln. | 0 |
| 3 | 0.1 mole/l chromium chloride aq. soln. | P |

Activity Tests

The catalysts prepared in the foregoing examples and comparison examples were tested for $NH_3$ oxidation decomposition efficiency, percent NO formation, denitration efficiency and percent $SO_2$ oxidation to compare the catalysts in respect of activity.

Test 1

The catalysts (A), (B) and (C) prepared in Examples 1, 2 and 3, the catalyst carrier (L) prepared in the course of the procedure of Example 1 and a chromium oxidediatomaceous earth catalyst (M) were tested for activity with use of a quartz reactor tube of the flow type 30 mm in inside diameter. The chromium oxide-diatomaceous earth catalyst (M) was prepared from a commercial diatomaceous earth plus 14 to minus 8 mesh in grain size (Tyler scale) having a hygroscopicity of 84% and serving as a carrier by immersing the carrier in an aqueous solution of chromium chloride (5.9% by weight, calculated as Cr) for 3 hours and firing the resulting carrier at 500° C. for 5 hours.

First the catalyst (A) was placed in the reactor tube as positioned in the center of the tube and sandwiched between layers of Raschig rings of 4 mm in diameter, with the Raschig rings held outside the interior spaces of the catalyst Paul rings.

Subsequently the reactor tube was adjusted to a specified reaction temperature by an annular electric oven surrounding the tube, and a simulated exhaust gas of the composition shown in Table 5 was passed through the reactor.

Table 5

| Component | Proproportion (vol. %) |
|---|---|
| $NH_3$ | 0.05 |
| $SO_2$ | 0.04 |
| $O_2$ | 5.0 |
| $CO_2$ | 12.0 |
| $H_2O$ | 10.0 |
| $N_2$ | Balance |

Based on a dry state, the gas was passed at a rate of 1.2 liters/min (S.T.P.) at an apparent space velocity of 4,000 hr.$^{-1}$, the flow rate of the gas being 18 m/hr. per unit surface area of the catalyst.

The $NH_3$ oxidation decomposition efficiency or $NH_3$ removal efficiency, percent $SO_2$ oxidation and percent NO formation were calculated from the following equations based on the concentrations of $NH_3$, $SO_2$ and NO as measured at the inlet and outlet of the reactor tube.

$NH_3$ oxidation decomposition efficiency (i.e. $NH_3$ removal efficiency) = $\frac{(NH_3 \text{ concn. at inlet}) - (NH_3 \text{ concn. at outlet})}{(NH_3 \text{ concn. at inlet})} \times 100$ Percent NO formation
= $\frac{(NO \text{ concn. at outlet}) - (NO \text{ concn. at inlet})}{(NO \text{ concn. at inlet}) - (NO \text{ concn. at outlet})} \times 100$ However when (NO concn. at outlet) was smaller than (NO concn. at inlet), it was thought that denitration was taking place, so that the negative value of the denitration efficiency below was taken as the percent NO formation.

Denitration efficiency
= $\frac{(NO \text{ concn. at inlet}) - (NO \text{ concn. at outlet})}{(NO \text{ concn. at inlet})} \times 100$ Percent $SO_2$ oxidation
= $\frac{(SO_2 \text{ concn. at inlet}) - (SO_2 \text{ concn. at outlet})}{(SO_2 \text{ concn. at inlet})} \times 100$ The concentrations of $NH_3$, $SO_2$ and NO were determined by the following methods.

$NH_3$: By passing the gas at the inlet or outlet of the reactor tube through a solution containing dilute sulfuric acid for absorbing $NH_3$, rendering the resulting solution alkaline with NaOH and determining the concentration of $NH_3$ absorbed with use of an ammonia ion electrode.

$SO_2$: By iodometric titration.

NO: With use of a continuous nitrogen oxide analyzer of the chemiluminescence type.

The same procedure as above was repeated for the catalysts (B), (C) and (M) and the catalyst carrier (L).

The amount of the catalyst paced in the test reactor was 7 ml.

Figure 2:
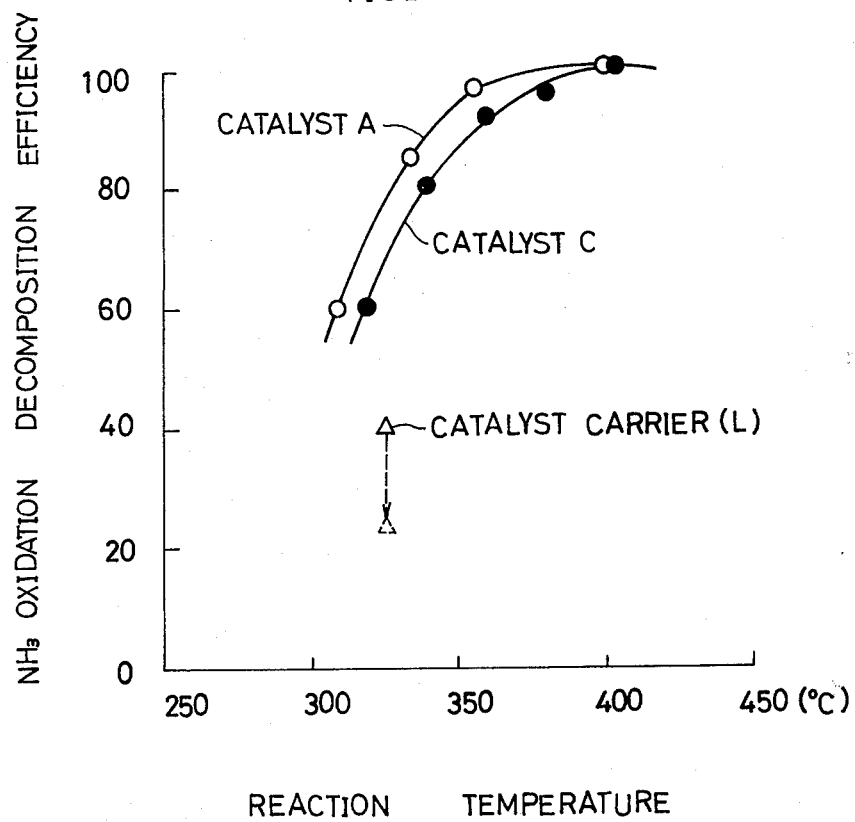
FIG. 2 is a graph showing the relationship between the reaction temperature and the $NH_3$ oxidation decomposition efficiency.
Figure 3:
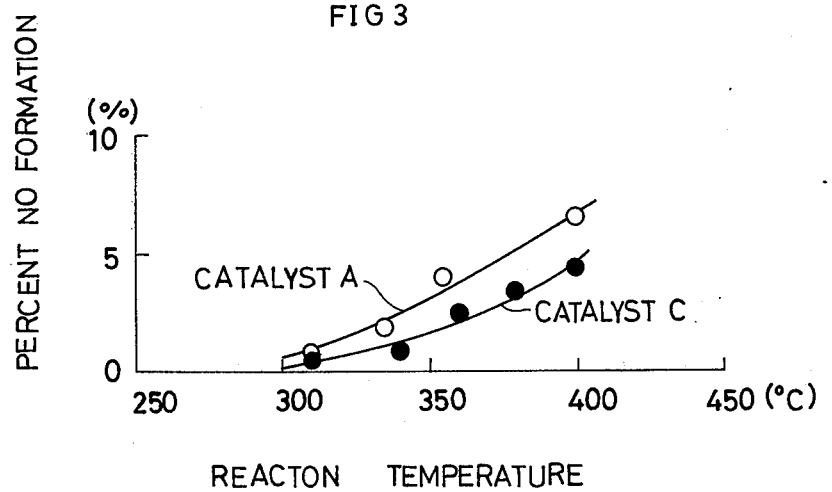
FIG. 3 is a graph showing the relationship between the reaction temperature and percent NO formation.
Figure 4:
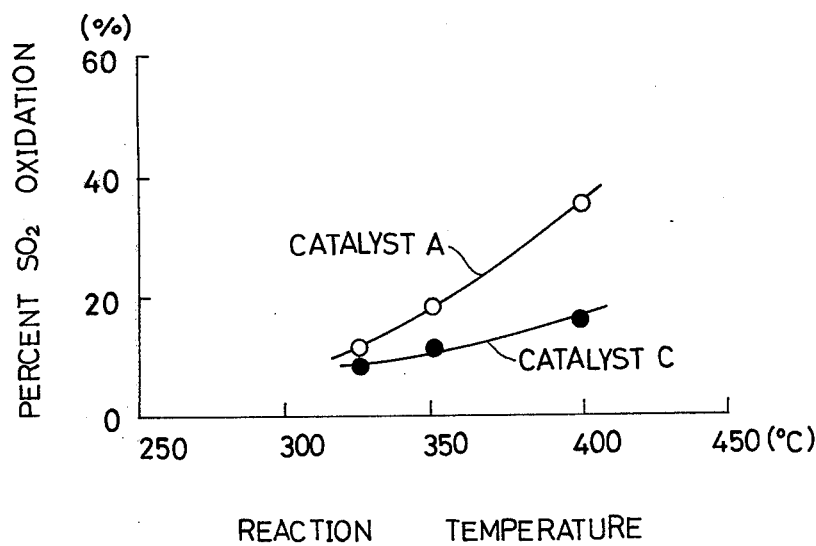
FIG. 4 is a graph showing the relationship between the reaction temperature and the percent $SO_2$ oxidation.
Figure 5:
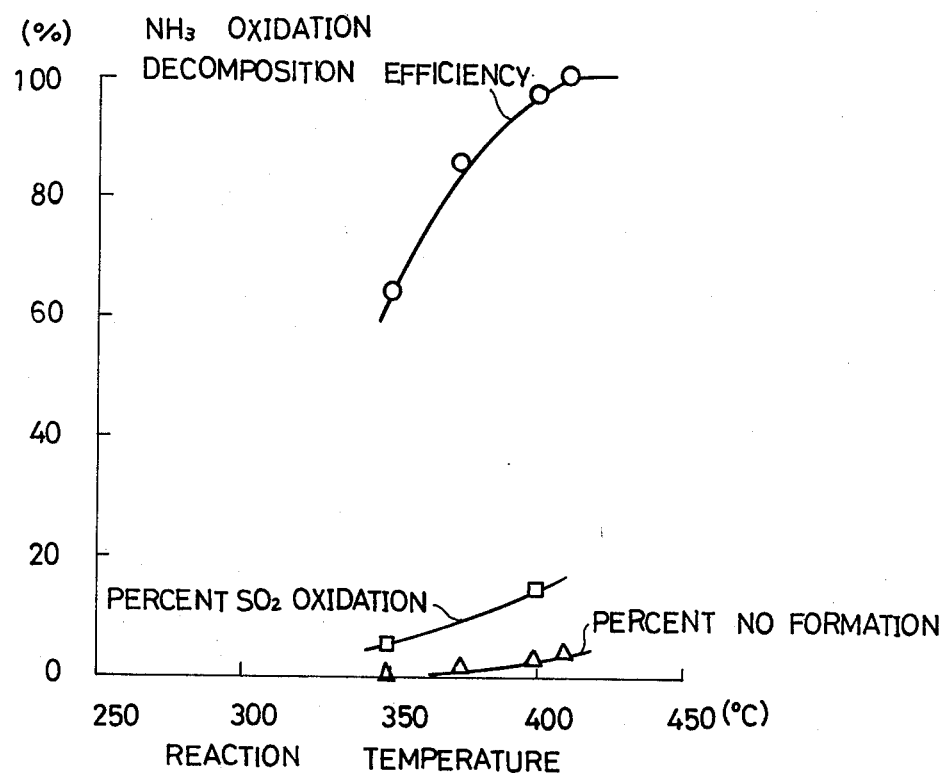
FIG. 5 is a graph showing the relations of the reaction temperature to the $NH_3$ oxidation decomposition efficiency, percent $SO_2$ oxidation and percent NO formation.
Figure 6:
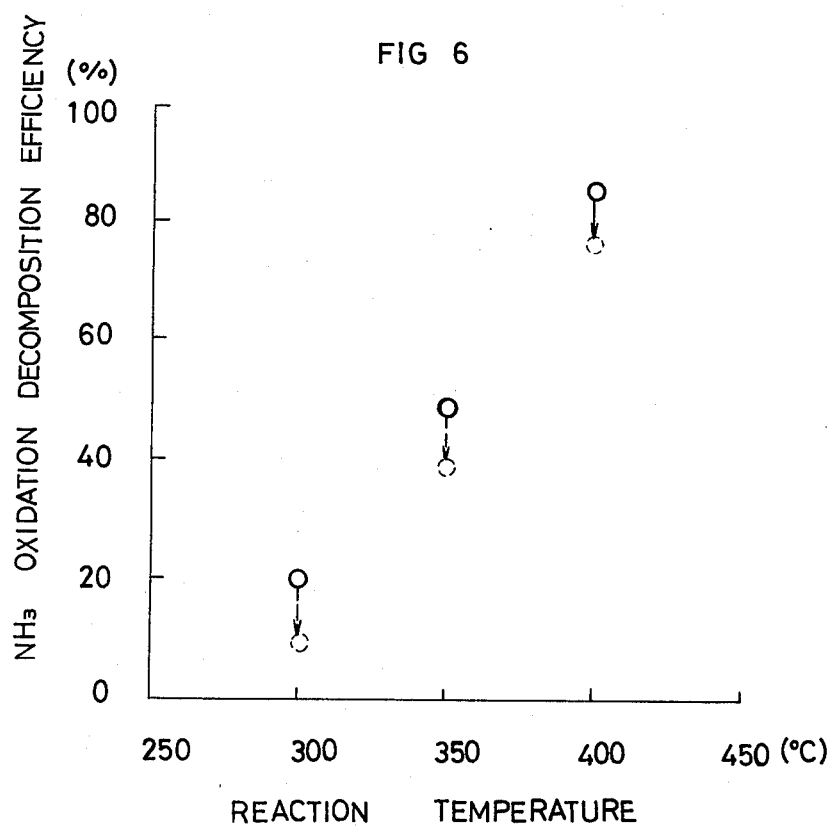
FIG. 6 is a graph showing the relation between the reaction temperature and the $NH_3$ oxidation decomposition efficiency.

The test results are shown in FIGS. 2 to 6. FIG. 2 indicates that the activity of the carrier L sharply reduced within 30 minutes after the initiation of the passage of the gas as indicated by the vertical arrow, whereas the catalysts (A) and (C) remained active with high stability even in about 2 hours, exhibiting a high degree of freedom from poisoning by $SO_2$. FIG. 3 reveals that the catalysts (A) and (C), or especially the catalyst (C) effectively inhibited the formation of NO. FIG. 4 shows that the Pt- and Rh-containing catalyst (C) exerted a high inhibitive effect on the oxidation of $SO_2$ to $SO_3$. FIG. 5 illustrates the results the catalyst (B) achieved in the activity test, revealing that the $NH_3$ decomposing activity of the catalyst is exceedingly higher than its $SO_2$ oxidizing activity and NO forming activity. FIG. 6 shows the $NH_3$ oxidation decomposition efficiency achieved by the catalyst (M) when the reaction was conducted at 300° C., 350° C. and 400° C. for 30 minutes at each reaction temperature. As indicated by the arrows in FIG. 6, the catalyst (M) greatly degraded in its activity.

Test 2

Figure 7:
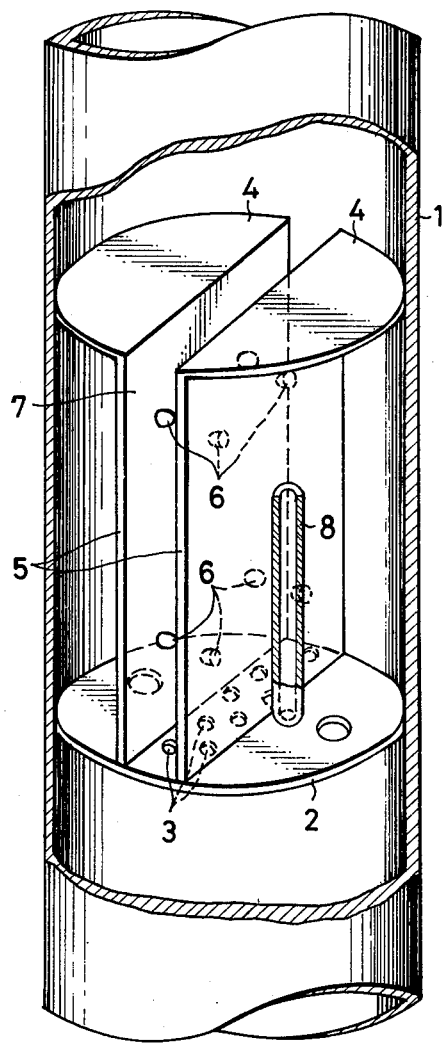
FIG. 7 is a perspective view partly broken away and showing an activity testing reactor.

The catalysts (D) to (K) prepared in Examples 4 to 11 and the catalysts (N) to (P) prepared in Comparison Examples 1 to 3 were tested for activity with use of the quartz reactor of the flow type shown in FIG. 7.

With reference to FIG. 7, the reactor comprises a quartz reactor tube 1 of 30 mm in inside diameter, a lower horizontal quartz plate 2 having a number of air holes 3, upper horizontal quartz plates 4, and a pair of vertical quartz plates 5 facing each other and extending between the opposed upper and lower quartz plates 2, 4. The vertical plates 5 are provided with a number of projections 6 for supporting panels of catalyst. The space 7 between the pair of vertical quartz plates 5 is open at its upper end through which catalyst panels are placed into the space 7. Indicated at 8 is a protective tube for a thermometer.

The catalyst (D) was packed into the space 7 of the reactor first, and the reactor was adjusted for reaction to a temperature of 380° C. by an annular electric oven surrounding the reactor. Two kinds of simulated exhaust gases of the compositions shown in Table 6 were passed through the reactor respectively separately.

Table 6

| Composition | Simulated exhaust gas No. | |
|---|---|---|
| | 1 | 2 |
| $NH_3$ | 120 (vol. ppm) | 120 (vol. ppm) |
| NO | 0 (vol. ppm) | 120 (vol. ppm) |
| $SO_2$ | 300 (vol. ppm) | 300 (vol. ppm) |
| $O_2$ | 5 (vol. %) | 5 (vol. %) |
| $CO_2$ | 12 (vol. %) | 12 (vol. %) |
| $H_2O$ | 10 (vol. %) | 10 (vol. %) |
| $N_2$ | Balance | Balance |

Based on a dry state, the gas was passed at a rate of 1.2 l/min. (S.T.P.). The catalyst had an apparent surface area of 28 cm$^2$. Accordingly the flow rate of the gas was 25.7 m/hr. per unit surface area of the catalyst.

In the same manner as in Test 1, the $NH_3$ oxidation decomposition efficiency, namely $NH_3$ removal efficiency, percent $SO_2$ oxidation and percent NO formation were calculated from the concentrations of $NH_3$, $SO_2$ and NO as measured at the inlet and outlet of the reactor.

The same procedure as above was repeated for the other catalysts. The results achieved are given in Table 7.

Table 7

| Catalyst | Exhaust gas No. | NH₃ removal efficiency (%) | Percent NO formation | Denitration efficiency (%) |
|---|---|---|---|---|
| (example) | | | | |
| D | 1 | 83 | 15 | |
| " | 2 | 83 | −2 | |
| E | 1 | 83 | 22 | |
| " | 2 | 83 | | 5 |
| F | 1 | 79 | 5 | |
| " | 2 | 90 | | 23 |
| G | 1 | 70 | 8 | |
| " | 2 | 78 | | 13 |
| H | 1 | 90 | 9 | |
| " | 2 | 90 | | 14 |
| I | 1 | 63 | 8 | 29 |
| " | 2 | 75 | | 29 |
| J | 1 | 80 | 12 | |
| " | 2 | 80 | | 28 |
| K | 1 | 48 | 7 | |
| " | 2 | 71 | | 32 |
| (Comp. Ex.) | | | | |
| N | 1 | 15 | 0 | |
| " | 2 | 65 | −60 | |
| O | 1 | 44 | 4 | |
| P | 1 | 54 | 8 | |

The percent SO₂ oxidation values for the catalysts (D), (N) and (E) to (K) were 12 to 14%. The catalysts (E) to (K), when used for the treatment of the NO-containing exhaust gas No. 2, reduced the NO content of the gas. The denitration efficiencies concerned are listed in terms of the resulting reductions.

Table 7 shows that the catalyst (N) was unable to substantially remove NH₃ from the NO-free exhaust gas and that the catalysts (O) and (P) achieved poor NH₃ removal efficiencies. Thus the catalysts of the comparison examples are not suited to use, whereas the catalysts of the examples according to this invention all efficiently removed NH₃ from the SO₂-containing exhaust gages, with NO formation inhibited, and are therefore very useful.

What we claim is:

1. A process for producing a catalyst precursor for decomposing NH₃ by oxidation consisting essentially of the steps of converting the surface layer of steel material of specified shape resembling a ring, honeycomb or plate to an aluminum alloy, treating the steel material with an aluminum dissolving solution to dissolve out the aluminum and to render the surface layer porous, subjecting the resulting steel material to oxidation treatment to obtain a catalyst carrier, immersing the carrier in a solution of a platinum compound selected from the group consisting of chroloplatinic acid and platinum sulfate, and drying it.

2. A process as defined in claim 1 wherein the surface layer of the steel material is converted to an aluminum alloy by heat-treating an aluminum-coated steel material.

3. A process as defined in claim 1 wherein the aluminum is dissolved out by immersing the steel material having the alloy layer in the aluminum dissolving solution.

4. A process as defined in claim 1 wherein the aluminum dissolving solution is an aqueous solution of an alkali metal hydroxide.

5. A process as defined in claim 1 wherein the oxidation treatment is conducted under mild conditions.

6. A process as defined in claim 5 wherein the oxidation treatment is conducted by contacting the porous surface layer of the steel material with a gas containing 0.1 to 20.8% by volume of oxygen.

7. A process as defined in claim 1 wherein the carrier is immersed in an aqueous solution of chloroplatinic acid having a concentration of 0.01 to 1.0% by weight calculated as platinum.

8. A precursor for a catalyst for decomposing NH₃ by oxidation produced by the process defined in claim 1.

9. A process as defined in claim 1 wherein after immersion of the carrier in a solution of a platinum compound, the carrier is fired at a temperature of 300° to 500° C., theresulting platinum-supporting carrier is immersed in a solution of a rhodium compound selected from the group consisting of rhodium chloride and rhodium sulfate, and dried.

10. A process as defined in claim 9 wherein the platinum-supporting carrier is immersed in an aqueous solution of rhodium chloride having a concentration of 0.01 to 0.5% by weight calculated as rhodium.

11. A process as defined in claim 1 wherein after immersion of the carrier in a solution of a platinum compound, the carrier is fired at a temperature of 300° to 500° C., is immersed in an aqueous solution or oxalic acid solution of ammonium metavanadate and dried.

12. A process as defined in claim 1 wherein the carrier is immersed in an aqueous solution or oxalic acid solution of ammonium metavanadate, fired at a temperature of 600° to 700° C., immersed in a solution of a platinum compound selected from the group consisting of chloroplatinic acid and platinum sulfate, and dried.

13. A precursor for a catalyst for decomposing NH₃ by oxidation produced by the process defined in claim 10.

14. A precursor for a catalyst for decomposing NH₃ by oxidation produced by the process defined in claim 11.

15. A precursor for a catalyst for decomposing NH₃ by oxidation produced by the process defined in claim 12.

* * * * *